(12) United States Patent
Nakagawa

(10) Patent No.: US 11,610,293 B2
(45) Date of Patent: Mar. 21, 2023

(54) IMAGE PROCESSING APPARATUS AND IMAGE PROCESSING METHOD

(71) Applicant: CANON KABUSHIKI KAISHA, Tokyo (JP)

(72) Inventor: Koichi Nakagawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/585,930

(22) Filed: Jan. 27, 2022

(65) Prior Publication Data

US 2022/0253993 A1  Aug. 11, 2022

(30) Foreign Application Priority Data

Feb. 5, 2021  (JP) .............................. JP2021-017739

(51) Int. Cl.
| | |
|---|---|
| *G06T 5/50* | (2006.01) |
| *G06V 10/74* | (2022.01) |
| *G06V 40/16* | (2022.01) |
| *H04N 23/60* | (2023.01) |
| *H04N 23/80* | (2023.01) |
| *H04N 23/90* | (2023.01) |
| *H04N 23/63* | (2023.01) |

(52) U.S. Cl.
CPC .............. *G06T 5/50* (2013.01); *G06V 10/761* (2022.01); *G06V 40/161* (2022.01); *H04N 23/633* (2023.01); *H04N 23/64* (2023.01); *H04N 23/80* (2023.01); *H04N 23/90* (2023.01); *G06T 2207/20081* (2013.01); *G06T 2207/30201* (2013.01)

(58) Field of Classification Search
CPC .............. G06T 5/50; G06T 2207/20081; G06T 2207/30201; G06T 5/005; G06V 10/761; G06V 40/161; G06V 10/7784; G06V 10/82; H04N 23/633; H04N 23/64; H04N 23/80; H04N 23/90; H04N 23/611; H04N 23/62; H04N 23/631; H04N 23/634; H04N 23/698; H04N 9/646; H04N 9/73; H04N 23/13; H04N 23/843

See application file for complete search history.

(56) References Cited

U.S. PATENT DOCUMENTS

| | | | |
|---|---|---|---|
| 9,390,339 B1 * | 7/2016 | Danko ................... | G06T 5/003 |
| 10,438,630 B2 | 10/2019 | Nakagawa | |
| 2015/0355527 A1 * | 12/2015 | Takahashi .............. | H04N 23/56 |
| | | | 348/371 |
| 2016/0232680 A1 * | 8/2016 | Peana ................... | G06T 11/001 |

OTHER PUBLICATIONS

Xue, T. et al., "A Computational Approach for Obstruction-Free Photography" ACM Transactions on Graphics (Aug. 2015) pp. 79.1-79.11, vol. 34, No. 4, Article 79.

* cited by examiner

*Primary Examiner* — Mekonnen D Dagnew
(74) *Attorney, Agent, or Firm* — Carter, DeLuca & Farrell LLP

(57) ABSTRACT

An image processing apparatus acquires first image data obtained by capturing an image of a subject, second image data obtained by capturing an image of a person capturing the subject and surroundings thereof, and third image data indicating an appearance of an image capture apparatus that captures the image of the subject. The apparatus reduces a reflection in the first image data using a learned machine learning model that uses the first image data, the second image data, and the third image data as input data.

13 Claims, 7 Drawing Sheets

402
401

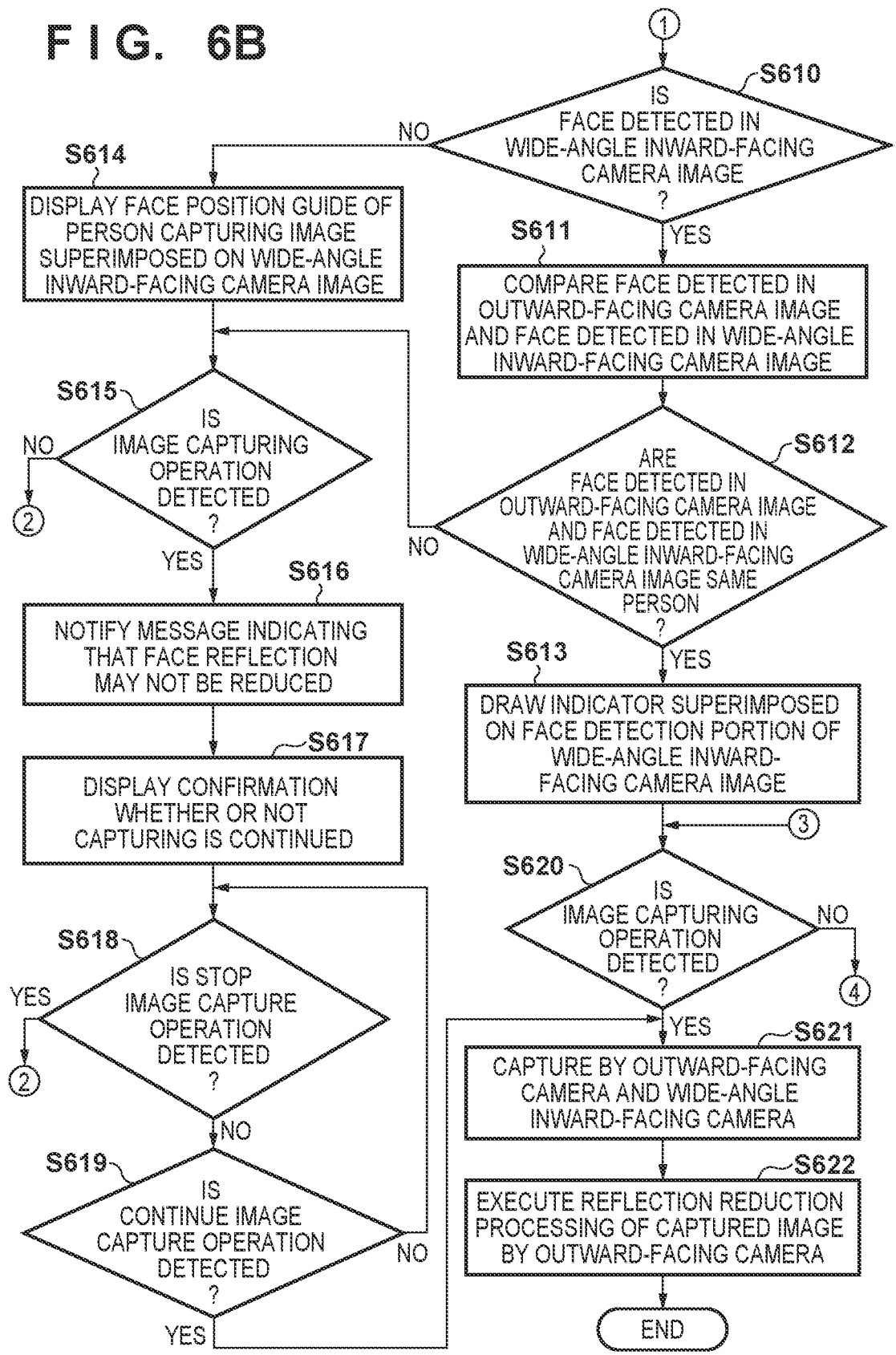

IMAGE PROCESSING APPARATUS AND IMAGE PROCESSING METHOD

BACKGROUND OF THE INVENTION

Field of the Invention

The present invention relates to an image processing apparatus and an image processing method and particularly relates to technology for removing a reflection in a captured image.

Description of the Related Art

An image captured through glass and an image captured of a glossy subject may include a reflection of the person capturing the image or surrounding objects. Such reflections may not only obscure the intended subject, but also cause personal information to be leaked.

In Tianfan Xue, Michael Rubinstein, Ce Liu, William T. Freeman, "A Computational Approach for Obstruction-Free Photography", ACM Transactions on Graphics, vol. 34, no. 4 (Proc. SIGGRAPH), August 2015, technology is described for removing reflections in an image captured through glass using the visual parallax relating to the background scene and the foreground scene.

However, the technology described in the present Patent Document has a limitation in that images of a scene having both a background scene and a foreground scene need to be captured from a plurality of viewpoints.

SUMMARY OF THE INVENTION

According to an aspect of the present invention, limitations relating to capturing scenes and image capture method on an image processing apparatus and an image processing method able to reduce a reflection in a captured image are reduced.

According to an aspect of the present invention, there is provided an image processing apparatus comprising: one or more processors that execute a program stored in a memory and thereby function as an acquisition unit that acquires first image data obtained by capturing an image of a subject, second image data obtained by capturing an image of a person capturing the subject and surroundings thereof, and third image data indicating an appearance of an image capture apparatus that captures the image of the subject; and an image processing circuit that acquires image data in which a reflection in the first image data is reduced using a learned machine learning model that uses the first image data, the second image data, and the third image data as input data.

According to another aspect of the present invention, there is provided an image processing method executed by an image processing apparatus, comprising: acquiring first image data obtained by capturing an image of a subject, second image data obtained by capturing an image of a person capturing the subject and surroundings thereof, and third image data indicating an appearance of an image capture apparatus that captures the image of the subject; and acquiring image data in which a reflection in the first image data is reduced using a learned machine learning model that uses the first image data, the second image data, and the third image data as input data.

According to a further aspect of the present invention, there is provided a non-transitory computer-readable storage medium storing a program for causing a computer to execute an image processing method comprising: acquiring first image data obtained by capturing an image of a subject, second image data obtained by capturing an image of a person capturing the subject and surroundings thereof, and third image data indicating an appearance of an image capture apparatus that captures the image of the subject; and acquiring image data in which a reflection in the first image data is reduced using a learned machine learning model that uses the first image data, the second image data, and the third image data as input data.

Further features of the present invention will become apparent from the following description of exemplary embodiments (with reference to the attached drawings).

BRIEF DESCRIPTION OF THE DRAWINGS

FIGS. 6A and 6B are flowcharts relating to the operations of a reflection reduction mode of a smart phone according to an embodiment of the present invention.

DESCRIPTION OF THE EMBODIMENTS

Figure 1:
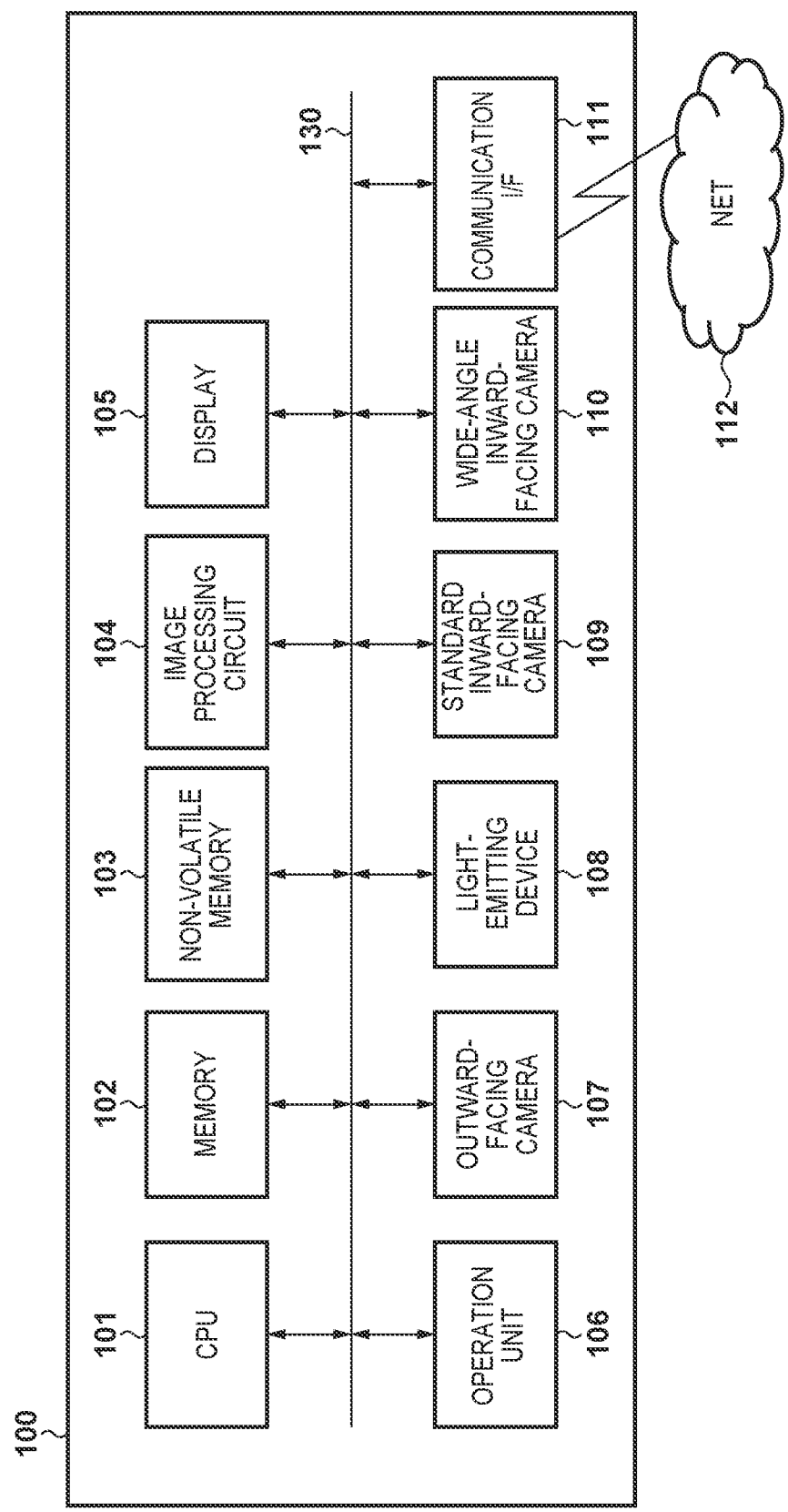
FIG. 1 is a block diagram illustrating an example configuration of a smart phone, which is an example of an image processing apparatus according to an embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Note that in the following embodiments, the present invention is describing using the example of a smart phone provided with a camera (inward-facing camera) facing inward (the side of the person capturing the image) and a camera (outward-facing camera) facing outward (the side of the subject). However, the present invention is able to be implemented as other electronic devices that are provided with an inward-facing camera and an outward-facing camera, such as a tablet terminal and a laptop computer. Also, the inward-facing camera and the outward-facing camera may be attachable and detachable external devices.

Furthermore, an image capture function is not required in the present invention, and the present invention may be implement as a discretionary electronic device or system that is capable of acquiring, via any method, a captured image of a subject and data of the image of the person capturing the image when capturing the image. For example, the present invention may be implement as an electronic device capable of acquiring such image data from a communicatively connected external device.

Note that, ideally, the captured image of the subject and the image of the person capturing the image when capturing the image are captured at a corresponding timing or at the same time. However, the image capture timing may be different as long as the difference in time is short (for example, within one second, within a few seconds, or the like). Herein, the same time may mean outputting an image capture instruction to the image capture apparatus to capture each image at essentially the same time or may mean an overlap in the image exposure periods.

FIG. 1 is a diagram schematically illustrating via functional blocks an example configuration of a smart phone 10, which is an example of an image processing apparatus according to the present invention.

An internal bus 130 includes a data signal line, a control signal line, and the like and communicates data and control signals between the connected functional blocks.

A CPU 101 is the main control unit. The CPU 101 controls the operations of the functional blocks by loading programs (the OS, applications, and the like) stored in a non-volatile memory 103 into a memory 102 and executing them to realize the various functions of the smart phone 100.

The memory 102 is RAM, for example, and is used as a main storage apparatus, a working memory, a buffer memory, a video memory, and/or the like.

The non-volatile memory 103 is an electrically rewritable ROM, for example. The non-volatile memory 103 stores programs for the CPU 101 to execute, various setting values, system data such as graphical user interface (GUI) data, and user data, such as data of still images and moving images captured by the user, applications, and the like.

An image processing circuit 104 is controlled by the CPU 101 to apply various types of image processing to the image data obtained via image capture by an outward-facing camera 107, a standard inward-facing camera 109, and a wide-angle inward-facing camera 110 or the image data stored in the non-volatile memory 103. The image processing circuit 104 may be, for example, a dedicated hardware such as an application-specific integrated circuit (ASIC) designed to realize a specific function. Alternatively, the image processing circuit 104 may be configured to realize a specific function via a programmable processor such as a digital signal processor (DSP) executing a program stored in the non-volatile memory 103. Also, the image processing circuit 104 may include a dedicated circuit for executing high-speed calculations necessary for machine learning such as deep learning. Furthermore, depending on the processing, image processing may be applied via the CPU 101 executing a program instead of the image processing circuit 104.

Herein, the image processing applied by the signal processing circuit 104 includes preprocessing, color interpolation processing, correction processing, detection processing, data modification processing, evaluation value calculation processing, special effects processing, and the like.

Preprocessing includes noise reduction, defective pixel correction, A/D conversion, D/A conversion, and the like.

Color interpolation processing is processing for interpolating values of color components not obtained when capturing an image, and is also referred to as demosaicing processing or synchronization processing.

Correction processing includes white balance adjustment, gradation correction (gamma processing), processing for correcting the effects of optical aberration or vignetting of the optical system, processing for correcting color, and the like.

The detection processing includes processing for detecting a feature area (for example, a face area or a human body area) or movement thereof, processing for recognizing a person, and the like.

The data modification processing includes combining processing, scaling processing, encoding and decoding processing, header information generation processing, and the like.

The evaluation value calculation processing includes processing for generating signals or evaluation values that are used in automatic focus detection (AF), processing for calculating evaluation values that are used in automatic exposure control (AE), and the like.

Special effects processing includes processing for adding blurring, changing color tone, relighting processing, and the like. Note that these are examples of the image processing that can be applied by the image processing circuit 104, and are not intended to limit the image processing applied by the image processing circuit 104.

A display 105 is a touch liquid crystal display, for example. The display 105 is controlled by the CPU 101 to display images (icons, windows, software keys, and the like) of the GUI of the OS or applications, images captured by a camera, and the like.

The CPU 101 generates display data and stores the display data in a video memory area of the memory 102. The display 105 generates a video signal on the basis of the display data and displays the video signal on a display panel. Note that the video signal may be supplied to an external display.

An operation unit 106 is a generic name for a user-operable device, such as a button, a switch (hardware or software), a touch panel, or the like. The CPU 101 monitors the operation unit 106 and executes an operation in accordance with the operation target and operation content. Note that regarding touch operation on the display 105, the CPU 101 detects a touch position and recognizes a predetermined touch operation (tap, drag, pinch, wipe, and the like). The CPU 101 detects an operation on an input device, such as an externally connected keyboard, mouse, or the like.

The smart phone 100 includes one outward-facing camera 107, two inward-facing cameras 109 and 110. The two inward-facing cameras 109 and 110 include single focus lens with different angles of view, and the lens of the inward-facing camera 110 has a wider angle of view than the lens of the inward-facing camera 109. Thus, in the present specification, these are referred to as the standard inward-facing camera 109 and the wide-angle inward-facing camera 110. However, "standard" and "wide-angle" refer to the relationship between the angle of view of the two inward-facing cameras and are not intended to mean specific angles of view.

The outward-facing camera 107 is a camera unit including, for example, an image sensor such as a CCD/CMOS image sensor, an image capture optical system (lens), a shutter, a diaphragm, a focus detection circuit, an A/D converter, and the like. The lens of the outward-facing camera 107 may be a zoom lens or a single focus lens. Also, the lens includes a focus lens. The outward-facing camera 107 handles capturing still images and moving image. The image data obtained via image capture is transmitted to the image processing circuit 104, stored in a data file of a predetermined format, and stored in the non-volatile memory 103. If the display surface of the display 105 is defined as the front surface of the smart phone 100, the outward-facing camera 107 is provided on the rear surface of the smart phone 100.

A light-emitting device 108 is, for example, an auxiliary light source including one or more light-emitting elements (for example, LEDs). This is used for flash and video light when capturing an image. The color of the light of the light-emitting device 108 may be able to be adjusted.

The standard inward-facing camera 109 and the wide-angle inward-facing camera 110 are camera units with a similar configuration to that of the outward-facing camera 107 including a single focus lens. The standard inward-facing camera 109 and the wide-angle inward-facing camera 110 are provided on the front surface of the smart phone 100. Thus, the outward-facing camera 107 and the two inward-facing cameras 109 and 110 have image capture directions that are 180° different from one another.

A communication I/F 111 is an interface for communicating with an external device communicatively connected via a wired or wireless connection. The communication I/F 111 may support a plurality of communication standards. Also, the external device may be directly connected to the communication I/F 111 or may be connected via a network 112.

Figure 2A:
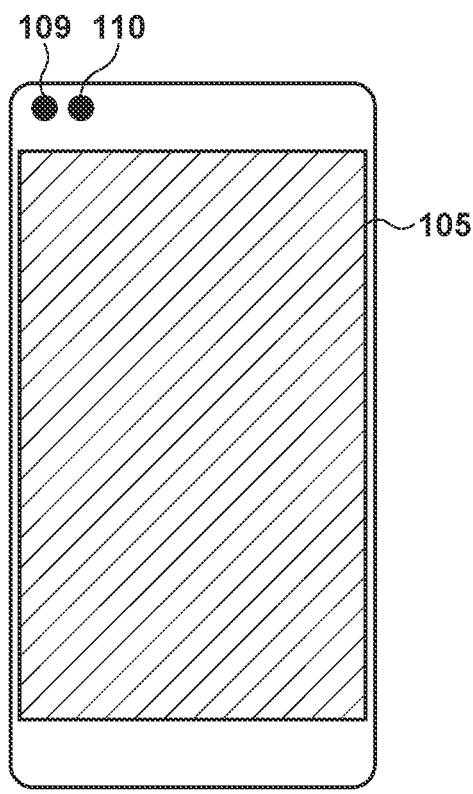
FIGS. 2A and 2B are diagrams illustrating an example of the appearance of the smart phone in FIG. 1.
Figure 2B:
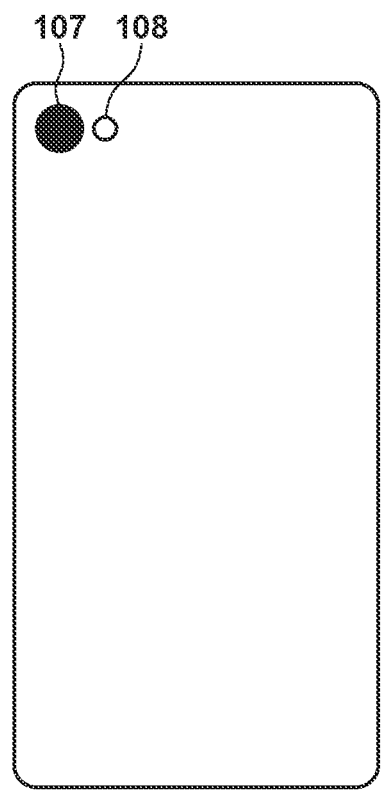

FIGS. 2A and 2B are diagrams illustrating an example of the appearance of the smart phone 100. FIG. 2A is a plan view of the surface (hereinafter, referred to as the front surface or display surface) where the display screen of the display 105 is located. Also, FIG. 2B is a plan view of a surface (rear surface) parallel with the front surface. In FIGS. 2A and 2B, components illustrated in FIG. 1 are given the same reference number as in FIG. 1.

The smart phone 100 of the present embodiment has a reflection reduction mode that can be selected when capturing an image using the outward-facing camera 107. In a case where the reflection reduction mode is selected, image capture using the outward-facing camera 107 and image capture using one (for example, the wide-angle inward-facing camera 110) of the inward-facing cameras are performed in parallel. Also, using the image of the person capturing the image captured by the wide-angle inward-facing camera 110, reflections in the image of the subject captured by the outward-facing camera 107 are reduced.

The reflection reduction mode can be selected by the user through operation of the GUI on the screen of an application capable of image capture using the outward-facing camera 107 and the inward-facing camera 110. Alternatively, the reflection reduction mode may be selected by default when a specific application is activated. Also, in a case where a moving image captured for EVF display during image capture standby state is analyzed by the image processing circuit 104 and reflections are detected, the reflection reduction mode may be configured to be automatically selected.

Hereinafter, an example will be described in which reflection reduction processing is executed by an application for capturing images in a reflection reduction mode. However, the reflection reduction processing may be implemented as a single function of a general-purpose application or may be a function provided by an OS.

Figure 3:
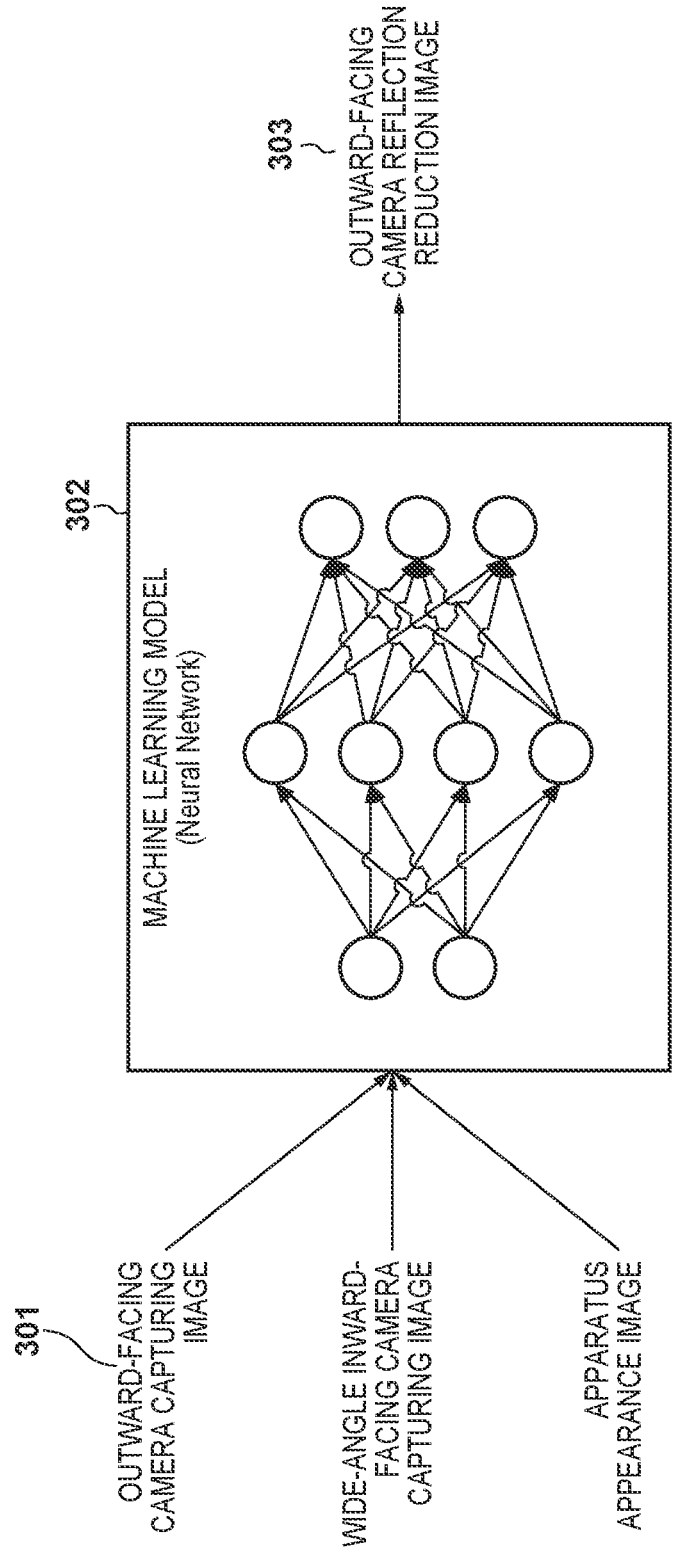
FIG. 3 is a conceptual diagram of reflection reduction processing using a learned machine learning model according to a present embodiment.

The reflection reduction processing on an image captured by the outward-facing camera 107 uses a learned machine learning (ML) implemented using a neural network, for example. FIG. 3 is a conceptual diagram of the reflection reduction processing using a learned ML model 302.

The machine learning model 302 outputs a subject image with reduced reflections, with the input data being:
1) first image data (subject image) obtained by the outward-facing camera 107 capturing an image of the subject,
2) second image data (image of person capturing the image) obtained by the wide-angle inward-facing camera 110 capturing an image of the person capturing the image of the subject and the surroundings, and
3) third image data (apparatus image) representing the appearance of the image capture apparatus (in this example, the smart phone 100) capturing an image of the subject.

Note that the image of the appearance of the smart phone 100 is an image of the back surface of the smart phone 100 that can be stored in advance in the non-volatile memory 103, for example.

Note that the machine learning model 302 may be stored in the non-volatile memory 103 or may be included in an external apparatus capable of communication with the smart phone 100. In a case where the machine learning model 302 is provided in an external apparatus, the machine learning model 302 may be used by being downloaded to the smart phone 100 via the communication I/F 111. Also, instead of the machine learning model 302 being downloaded, input data 301 may be transmitted to an external apparatus, and the calculations of the machine learning model 302 may be executed by the external apparatus. In a case where the calculations of the machine learning model 302 are executed by an external apparatus, the smart phone 100 receives the calculation result (subject image with reduced reflections) from the external apparatus.

In this example, the learning model 302 is either stored in the non-volatile memory 103 or downloaded from an external apparatus to the smart phone 100.

Note that the method for implementing the machine learning model 302 (configuration and number of layers of the neural network, activation function, and the like) and the learning method (loss function, optimization algorithms, and the like) may be of known technology. Also, the present invention does not dependent on the method of implementing the machine learning model 302 and the learning method. Thus, herein, only a simple description of the learning method of the machine learning model 302 is given, and specific details will be omitted.

The machine learning model 302 can learn using supervised learning. Specifically, as input data, a subject image with a reflection captured by the outward-facing camera 107, an image of the person capturing the image captured by the wide-angle inward-facing camera 110, and an apparatus image of the smart phone 100 are used. Also, as data indicating a target result (i.e., the target data), an image, corresponding to the input data of the subject image, with no or reduced reflections is used in the training data. The target data may be generated by applying image processing to a subject image with a reflection, or a subject image without a reflection captured from the same viewpoint as the subject image with a reflection may be used. For example, in an image captured through glass, an image with a reflection may be acquired via normal image capture, and then an image without a reflection may be acquired by capturing an image after blocking out the light in the surroundings of the smart phone 100.

The learned machine learning model 302 can be obtained by preparing various subjects and image capture environments as the input data and the learning data and training the machine learning model.

Next, reasons as to why a wide-angle inward-facing camera image is sent to the machine learning model will be described. The reflection in the subject image corresponds to a mirror image of an image captured in a direction from the subject toward the outward-facing camera 107. The image captured in a direction from the subject to the outward-facing camera 107 is significantly similar to the image captured by the inward-facing camera. The machine learning model can be trained to reach convergence, on the basis of the similarity between the subject image captured by the outward-facing camera 107 and the image of the person capturing the image and the surroundings captured by the inward-facing camera, to come close to outputting a result of removing or reducing reflections, i.e., the target data.

Also, an image obtained by the wide-angle inward-facing camera 110 capable of capturing an image of the surroundings of the person capturing the image in a wider range than the standard inward-facing camera 109 is more useful in detecting similarity in images with a reflection than an image obtained by the standard inward-facing camera 109.

Further, since a reflection of the smart phone 100 that captures an image of the subject is likely included in the subject image, an image of the external appearance of the smart phone 100 is sent to the machine learning model. Using an image of the external appearance of the smart phone 100 as input data allows the machine learning model to easily detect a reflection of the smart phone 100 in the subject image and thus is advantageous for convergencing the training so that the output result is close to the target data. This is useful in helping the training reach convergence so that the output result is close to the target data.

FIGS. 4A to 4F and FIGS. 5A and 5B are diagrams illustrating examples of the display of reflection reduction application. The CPU 101 executes an application, and the image processing circuit 104 or the like is controlled to display these displays.

Figure 4A:
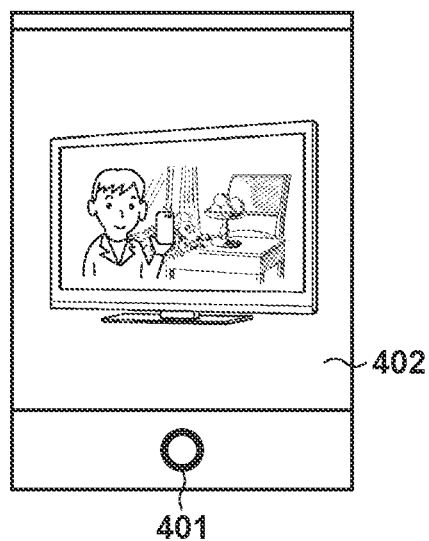
FIGS. 4A and 4C to 4F are diagrams illustrating examples of the display of a reflection reduction image capture application according to an embodiment of the present invention.

FIG. 4A illustrates a display state when the application is activated. In the lower portion of the application screen, the GUI of an image capture button 401 is displayed. Also, when the application is activated, image capture standby state is activated, and a video 402 captured by the outward-facing camera 107 is displayed in real time on the application screen. The CPU 101 continuously executes moving image capture processing by the outward-facing camera 107, moving-image-data-for-display generation processing by the image processing circuit 104, and display processing of moving image data by the display 105.

The user can check the image capture area, the exposure state, and the like via the video 402. The image capture button 401 is touched to capture an image. When a touch operation of the image capture button 401 is detected, the CPU 101 executes image capture processing in reflection reduction mode.

Figure 4B:
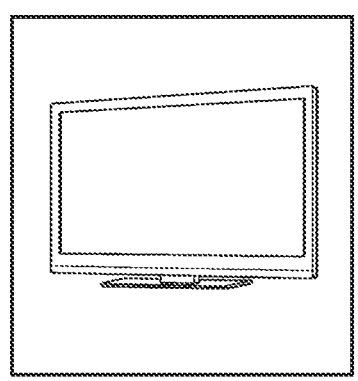
FIG. 4B is a diagram illustrating an example of the appearance of a subject.

FIG. 4A illustrates a scene in which a television is included as the main subject and there is a reflection of a user and their surroundings on the television screen. FIG. 4B illustrates an image with the reflection removed via reflection reduction processing. By reducing the reflection in this manner, an image in which the main subject is prominent is obtained. Also, in the case of the image being uploaded to the Internet, the personal information of the user can be protected from being leaked.

In the reflection reduction mode, the CPU 101 also captures a video with the wide-angle inward-facing camera 110 while in standby. Then, the CPU 101 instructs the image processing circuit 104 to detect if there is a reflection of the user based on the image obtained by the inward-facing camera 110 and the image obtained by the outward-facing camera 107. The image processing circuit 104 uses known technology such as pattern matching to detect if there is a reflection of the user and notifies the CPU 101 of the result.

Figure 4C:
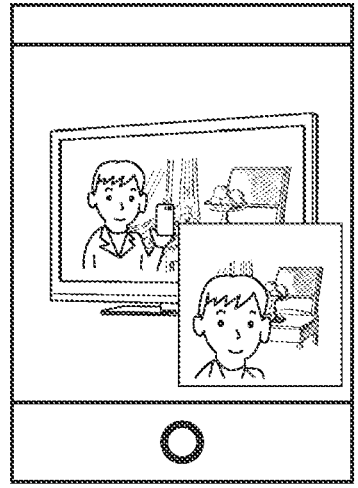

In a case where the CPU 101 is notified by the image processing circuit 104 that there is a reflection of the user, the CPU 101 instructs the image processing circuit 104 to display the video obtained by the wide-angle inward-facing camera 110 in a picture-in-picture mode, for example. In response to the instruction, the image processing circuit 104 starts the picture-in-picture display of the video obtained by the wide-angle inward-facing camera 110 (FIG. 4C).

Figure 4D:
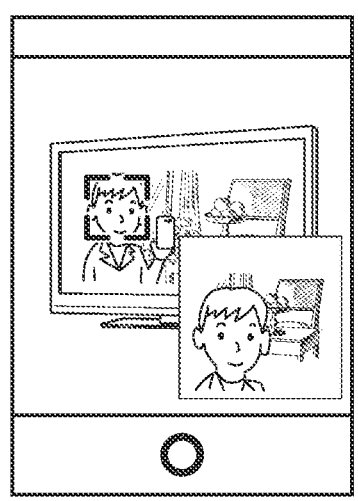

Furthermore, the image processing circuit 104 superimposes an indicator on the video being captured by the outward-facing camera 107 to inform the user of the reflection. FIG. 4D illustrates an example of a frame-like indicator superimposed in the area where there is a reflection of the user's face. Then image processing circuit 104 detects, in the video being captured by the outward-facing camera 107, the area similar to the face area detected in the video being captured by the wide-angle inward-facing camera 110 and displays a superimposed image of a frame around that area.

Figure 4E:
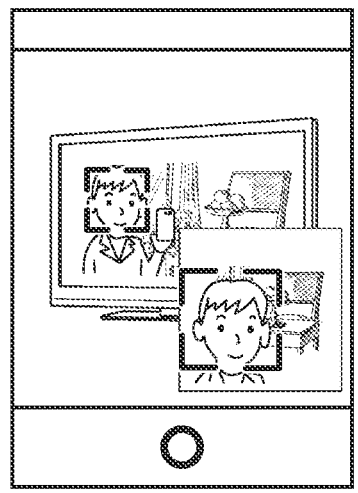

Also, on the video being captured by the wide-angle inward-facing camera 110, the image processing circuit 104 displays an indicator indicating the area similar to a reflection of the face in the video being captured by the outward-facing camera 107 (FIG. 4E).

In this manner, by using the face shown in the image being captured by the wide-angle inward-facing camera 110, the user can be informed that there is a high likelihood that the reflection of the face in the image being captured by the outward-facing camera 107 can be reduced.

However, there is a case where there is a reflection of a face in the image being captured by the outward-facing camera 107, but the image processing circuit 104 determines that a reflection of the face of the person in the image being captured by the wide-angle inward-facing camera 110 does not appear. In such a case, the image processing circuit 104 displays on the display 105 an indicator prompting the user to capture an image of the user's face with the wide-angle inward-facing camera 110.

As illustrated in FIG. 10, the image processing circuit 104 displays, as an indicator, a frame and a graphic resembling a face superimposed on the image captured by the wide-angle inward-facing camera 110. Note that, on the basis of an image of the reflection, the preferred size and position of where the user's face is shown in the image capture area of the wide-angle inward-facing camera 110 may be determined, and the indicator may be displayed at the position and with the size according to the determination result. Note that the indicator may be a message using words to express detailed instructions. By displaying the indicator in this manner, the likelihood of being able to more appropriately reduce reflection in a case where there is a reflection of a face in an image captured by the outward-facing camera 107 can be increased.

Figure 5A:
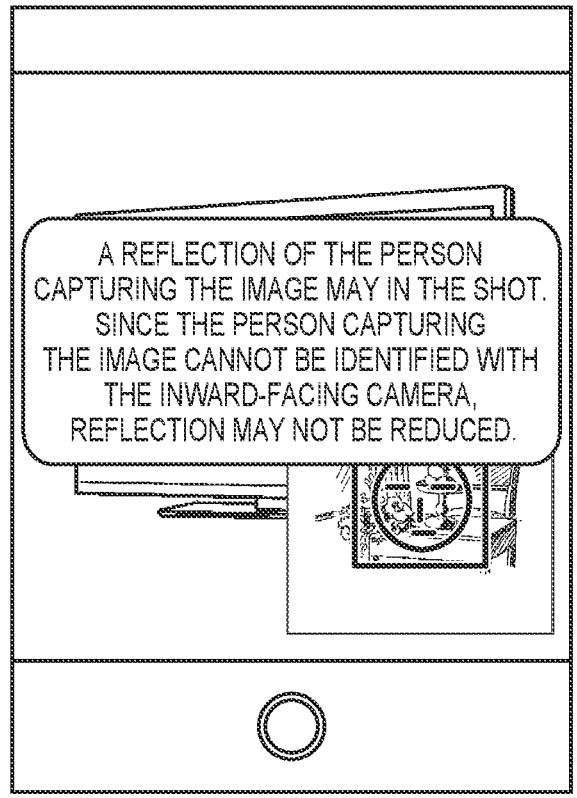
FIGS. 5A and 5B are diagrams illustrating examples of the display of a reflection reduction image capture application according to an embodiment of the present invention.

Note that, regardless of how the indicator is displayed, the image capture button 401 may be operated in a state in which the face is not shown in the wide-angle inward-facing camera 110. In this case, the CPU 101 instructs the image processing circuit 104 to display a message on the display 105 notifying the user that a face reflection cannot be reduced. FIG. 5A is an example of a message.

Figure 5B:
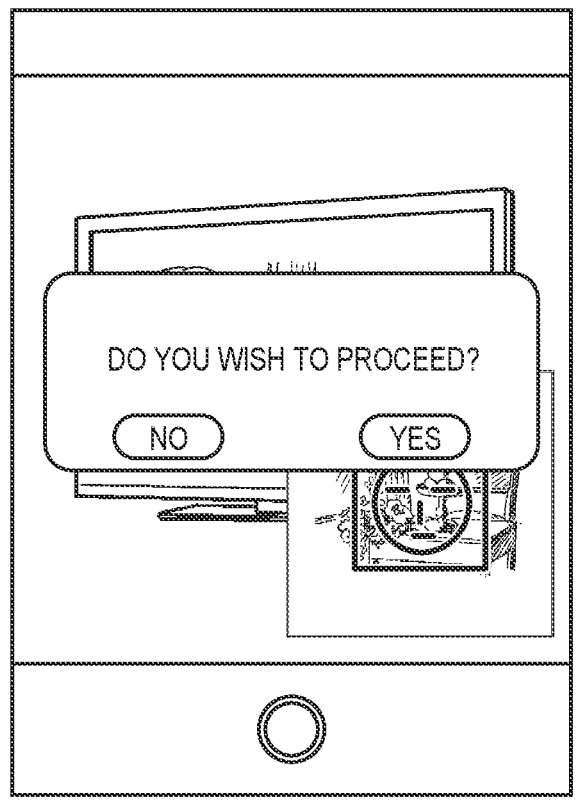

In the state illustrated in FIG. 5A, when a tap operation of the display 105 is detected, for example, the CPU 101 instructs the image processing circuit 104 to display on the display 105 a dialog box for the user to confirm whether or not they wish to continue image capture. FIG. 5B is an example of a confirmation dialog box.

The confirmation dialog box includes a "yes" and a "no" button for instructing as to whether or not to continue image capture. When a tap operation of the "yes" button is detected, the CPU 101 starts a still image capture operation. When a tap operation of the "no" button is detected, the CPU 101 notifies the image processing circuit 104 to cancel the confirmation dialog box. In this case, the display of the reflection reduction application returns to the state of FIG. 4F.

Next, the operations of the CPU 101 relating to image capture in the reflection reduction mode will be described using the flowchart illustrated in FIGS. 6A and 6B. In this example, the image capture environment is assumed to be that illustrated in FIGS. 4A to 4F.

In step S601, the CPU 101 determines whether or not a user operation to turn on the reflection reduction image capture mode has been detected. Herein, an operation to activate a reflection reduction image capture application installed in the smart phone 100 is considered to be an operation to turn on the reflection reduction image capture mode. Note that instead of detecting the operation, whether or not the current image capturing mode is set to the reflection reduction mode may be determined. In a case where the CPU 101 determines that a user operation to turn on the reflection reduction image capture mode has been detected, step S602 is executed. In a case where this is not determined, step S601 is repeatedly executed.

In step S602, the CPU 101 starts an image capture standby state operation. The CPU 101 starts capturing a video using the outward-facing camera 107. Also, the CPU 101 instructs the image processing circuit 104 to generate a video for display and to display the generated video. In this manner, a video showing the image capture area of the outward-facing camera 107 is continuously displayed on the display 105 (FIG. 4A).

Also, the CPU 101 instructs the image processing circuit 104 to execute face detection processing on the video captured by the outward-facing camera 107. The image processing circuit 104 starts executing face detection processing on the frame images of the video and notifies the CPU 101 of the detection result (the number, size, position, and the like of detected face areas). Note that the frequency at which the face detection processing is executed can be set according to the frame rate or performance of the image processing circuit 104. The image processing circuit 104 may continuously execute face detection processing or may execute face detection processing on one frame each time an instruction is received from the CPU 101. Thereafter, the CPU 101 executes step S603.

In step S603, the CPU 101 determines whether or not the angle of view of the inward-facing camera is set to wide-angle. The CPU 101 reads out the current inward-facing camera angle of view setting from the memory 102, for example, and determines whether or not the setting using the wide-angle inward-facing camera 110 is on. Alternatively, the CPU 101 may determine whether or not, from among the standard inward-facing camera 109 and the wide-angle inward-facing camera 110, the wide-angle inward-facing camera 110 is enabled. In a case where the angle of view of the inward-facing camera is determined to be wide-angle, the CPU 101 executes step S605. In a case where this is not determined, the CPU 101 executes step S604.

In step S604, the CPU 101 changes the angle of view setting of the inward-facing camera stored in the memory 102 to wide-angle. Then, the CPU 101 executes step S605.

In step S605, the CPU 101 analyzes the video started to be captured in step S602 by the outward-facing camera 107. For example, the CPU 101 instructs the image processing circuit 104 to execute face detection processing on the video captured by the outward-facing camera 107. Note that in a case where the image processing circuit 104 is instructed to continuously execute face detection processing in step S602, step S605 may be omitted. Then, the CPU 101 executes step S606.

In step S606, the CPU 101 determines if there is a reflection of a face in the video captured by the outward-facing camera 107. In a case where, for example, the result of face detection processing by the image processing circuit 104 is acquired and a face area is detected, the CPU 101 determines that there is a reflection of a face and executes step S607; and in a case where a face area is not detected, the CPU 101 determines that there is not a reflection of a face and executes step S620.

In step S607, the CPU 101 starts capturing video using the wide-angle inward-facing camera 110 (this may be started at step S605). Also, the CPU 101 instructs the image processing circuit 104 to, on the basis of the video captured by the wide-angle inward-facing camera 110, generate video for display and display the generated video via a picture-in-picture display. In this manner, the video showing the image capture area of the outward-facing camera 107 and the video captured by the wide-angle inward-facing camera 110 are continuously displayed on the display 105 (FIG. 4C). Then, the CPU 101 executes step S608.

In step S608, the CPU 101 instructs the image processing circuit 104 to display an indicator indicating the detected face area superimposed on the video captured by the outward-facing camera 107. In this manner, as illustrated in FIG. 4D, an indicator indicating the detected face area is displayed superimposed on the video captured by the outward-facing camera 107. Note that the superimposed display of the indicator indicating the face area may be displayed at the same time that an instruction to detect the face area is sent. Then, the CPU 101 executes step S609.

In step S609, the CPU 101 instructs the image processing circuit 104 to apply the face detection processing to the video captured by the wide-angle inward-facing camera 110. Then, the CPU 101 executes step S610. Note that the processing of step S609 may be included in the processing of step S607.

In step S610, the CPU 101, on the basis of the result of the face detection processing received from the image processing circuit 104, determines whether or not a face is included in the video captured by the wide-angle inward-facing camera 110. In a case where a face is detected in the video captured by the wide-angle inward-facing camera 110, the CPU 101 executes step S611. In a case where a face is not detected, the CPU 101 executes step S614.

In step S611, the CPU 101 instructs the image processing circuit 104 to calculate the degree of match between the face detected in the video captured by the outward-facing camera 107 and the face detected in the video captured by the wide-angle inward-facing camera 110, the degree of match indicating how much these two match. The image processing circuit 104, from the face area detected in both videos, converts the position, shape, and size of the eyes, nose, mouth, and the like, the overall shape of the face, bumps and recesses in the face, and other face features in numerical values. Also, the image processing circuit 104 compares the numerical values relating the face features and calculates the degree of match between the faces. The degree of match between the faces may be a sum of the differences in numerical values, for example, and in this case, a smaller value indicates a higher degree of match between the faces. The image processing circuit 104 notifies the CPU 101 of the calculated degree of match between the faces. When the CPU 101 receives the degree of match between the faces, the CPU 101 executes step S612.

In step S612, the CPU 101, on the basis of the degree of match between the faces, determines whether or not the face detected in the video captured by the outward-facing camera 107 and the face detected in the video captured by the wide-angle inward-facing camera 110 are the face of the same person. In a case where the degree of match between the faces is within a threshold, for example, the CPU 101 determines that the faces are of the same person and executes step S613. In a case where the degree of match is equal to or greater than the threshold, the CPU 101 determines that the faces are of different people and executes step S615.

Note that the processing of step S611 and step S612 may be implemented via extrapolation processing using a learned model. In this case, as the input data of the learned model, image data of the face portion detected in the video captured by the outward-facing camera 107 and image data of the face portion detected in the video captured by the wide-angle inward-facing camera 110 are used. Then, the learned model outputs a degree of match as the output data. Also, such a learned model can be generated via machine learning using a neural network, for example. In this case, the machine learning may be supervised learning that uses the image data of the face portion captured by the outward-facing camera 107 previously and the image data of the face portion captured by the wide-angle inward-facing camera 110 previously as input data and the degree of match between the two obtained via a predetermined method as the target data.

In step S613, the CPU 101 instructs the image processing circuit 104 to display an indicator indicating the detected face detection superimposed on the video captured by the wide-angle inward-facing camera 110. In this manner, as illustrated in FIG. 4E, an indicator indicating the detected face area is displayed superimposed on the video captured by the wide-angle inward-facing camera 110. Note that the superimposed display of the indicator indicating the face area may be displayed at the same time that an instruction to detect the face area is sent. Then, the CPU 101 executes step S620.

Figure 4F:
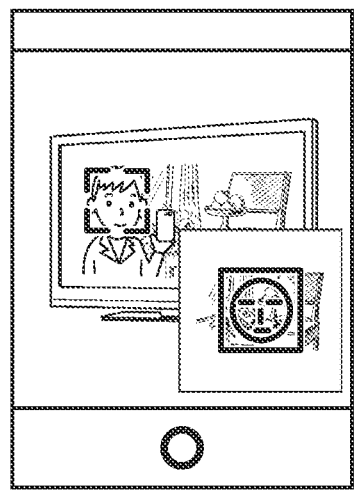

In step S614, the CPU 101 instructs the image processing circuit 104 to display an indicator (face position guide) prompting the user to change their position so that the user's face can be captured by the wide-angle inward-facing camera 110. In response to the instruction, the image processing circuit 104 displays a frame and a graphic resembling a face superimposed in a central area of the video captured by the w % ide-angle inward-facing camera 110, as illustrated in FIG. 4F, and displays a message superimposed in the manner illustrated in FIG. 5A, for example. Then, the CPU 101 executes step S615.

In step S615, the CPU 101 determines whether or not the user has performed an image capture operation. Specifically, the CPU 101 determines whether or not a touch operation has been performed on the image capture button 401. In a case where the CPU 101 determines that an image capture operation has been performed, the CPU 101 executes step S616. In a case where this is not determined, the CPU 101 executes step S605.

In step S616, the CPU 101 instructs the image processing circuit 104 to display a message indicating that a face reflection may not be reduced in a superimposed manner. Herein, the image processing circuit 104 displays on the display 105 a message saying "A reflection of the person capturing the image may be in the shot. Since the person capturing the image cannot be identified with the inward-facing camera, the reflection may not be reduced" (FIG. 5A). Then, the CPU 101 executes step S617.

In step S617, the CPU 101 determines whether or not a confirmation operation in response to the message, for example, a tap operation on the display 105, has been detected. In a case where the CPU 101 determines that a confirmation operation has been performed, the CPU 101 instructs the image processing circuit 104 to display on the display 105 a dialog box for the user to confirm whether or not they wish to continue image capture. Here, a dialog box including a message saying "Do you wish to proceed?" and a "yes" and "no" button is displayed on the display 105 by the image processing circuit 104 (FIG. 5B). Note that instead of detecting a confirmation operation, whether or not a predetermined amount of time has elapsed may be determined. Ten, the CPU 101 executes step S618.

In step S618, the CPU 101 determines whether or not a stop image capture operation has been detected. Specifically, the CPU 101 determines whether or not an operation on the "no" button in the confirmation dialog box displayed in step S617 has been detected. In a case where the CPU 101 determines that a stop image capture operation has been performed, the CPU 101 executes step S605. In a case where this is not determined, the CPU 101 executes step S619.

In step S619, the CPU 101 determines whether or not a continue image capture operation has been detected. Specifically, the CPU 101 determines whether or not an operation on the "yes" button in the confirmation message displayed in step S617 has been detected. In a case where the CPU 101 determines that a continue image capture operation has been performed, the CPU 101 executes step S621. In a case where this is not determined, the CPU 101 executes step S618.

In step S620, as in step S615, the CPU 101 determines whether or not the user has performed an image capture operation. In a case where the CPU 101 determines that an image capture operation has been performed, the CPU 101 executes step S621. In a case where this is not determined, the CPU 101 executes step S605.

In step S621, the CPU 101 executes image capture of a still image from the outward-facing camera 107 and the wide-angle inward-facing camera 110. The diaphragm used to capture still images, the shutter speed, and other parameters are set by the CPU 101 on the basis of evaluation values generated by the image processing circuit 104 on the basis of the video captured by the outward-facing camera 107. Also, the CPU 101 executes automatic focus detection for the optical system on the basis of the evaluation values generated by the image processing circuit 104 on the basis of the video captured by the outward-facing camera 107.

Furthermore, the CPU 101 instructs the image processing circuit 104 to generate still image data for recording based on the still image data captured by the outward-facing camera 107 and still image data used in reflection reduction mode based on the still image data obtained by the wide-angle inward-facing camera 110. The image processing circuit 104 applies, to the pieces of still image data, image processing prioritizing image quality more than image processing for generating video data for display. Then, the CPU 101 executes step S622.

In step S622, the CPU 101 instructs the image processing circuit 104 to apply the reflection reduction processing to the still image data captured by the outward-facing camera 107 in step S621. The image processing circuit 104 reads out the learned machine learning model 302 and the appearance image of the smart phone 100 from the non-volatile memory 103 and loads them onto internal memory or the memory 102. Then, the image processing circuit 104 sends the still image data for recording, the still image data generated from the still image data captured by the wide-angle inward-facing camera 110, and the appearance image of the smart phone 100 to the learned machine learning model 302 as input data. The image processing circuit 104 stores, in the non-volatile memory 103, an image with reduced reflections obtained as the output from the calculations of the learned machine learning model 302.

In this manner, the image processing apparatus according to the present embodiment can reduce reflections in a subject image by sending an image of the subject, an image of the person capturing the image and the surroundings, and an image of the appearance of the image capture apparatus to a learned machine learning as input data. By using an image of the person capturing the image and the surroundings and an image of the appearance of the image capture apparatus, reflections can be reduced using a configuration that does not use visual parallax, that does not require images of the same scene to be captured from a plurality of viewpoints, and that can reduce reflection in scenes other than scenes with a background scene and a foreground scene.

OTHER EMBODIMENTS

In the embodiment described above, the image processing apparatus includes a standard inward-facing camera and a wide-angle inward-facing camera. However, there may be only one inward-facing camera. In this case, the angle of view may be changed by electronically cropping the captured image.

Figure 6A:
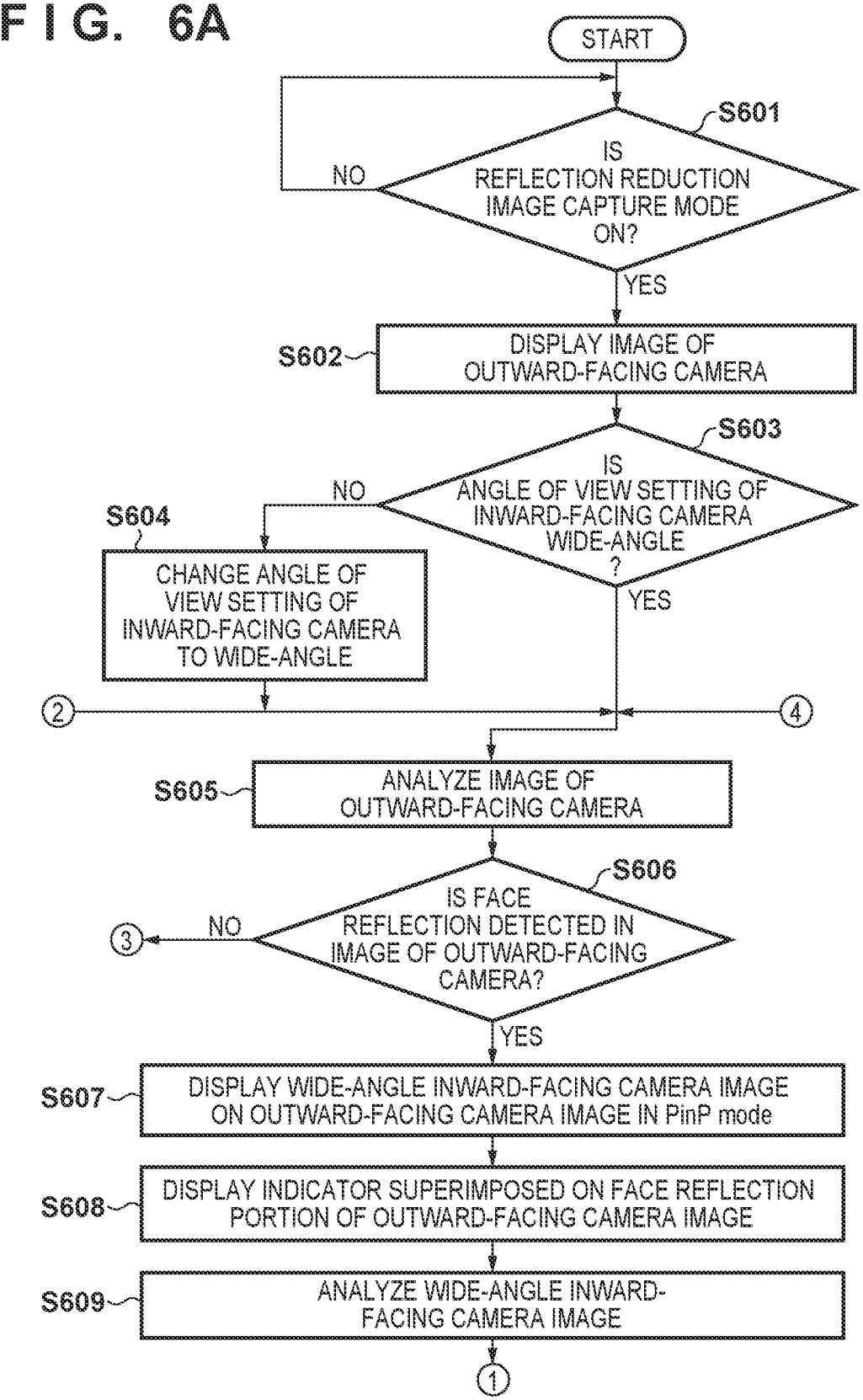

Note that to facilitate the description and understanding, the operations described using FIGS. 6A and 6B are of an example in which a face is not included in the main subject. In a case where it is unknown whether a face is included in the main subject, the following operations may be executed, for example.

In step S602, in a case where a face area is included in the video captured by the outward-facing camera 107, the image processing circuit 104 displays an indicator indicating the face area superimposed on the video for display (FIG. 4D).

In step S605, the CPU 101 starts capturing a video using the wide-angle inward-facing camera 110. Also, the CPU 101 instructs the image processing circuit 104 to also execute face detection processing on the video captured by the wide-angle inward-facing camera 110. Furthermore, the CPU 101 instructs the image processing circuit 104 to detect whether or not there is a reflection in the video captured by the outward-facing camera 107.

In a case where, for example, an area similar to the video captured by the wide-angle inward-facing camera 110 is included in the video captured by the outward-facing camera 107, the image processing circuit 104 determines that a reflection is in the video captured by the outward-facing camera 107. Also, in a case where the face area detected in the video captured by the wide-angle inward-facing camera 110 is included in an area similar to the video captured by the wide-angle inward-facing camera 110 in the video captured by the outward-facing camera 107, the image processing circuit 104 determines that there is a reflection of the person capturing the image. Also, the image processing circuit 104 notifies the CPU 101 of the face detection result, whether or not a reflection was detected, and whether or not a reflection of the person capturing the image was detected.

Then, in step S606, in a case where the CPU 101 has been notified by the image processing circuit 104 that there is a reflection of the person capturing the image, the CPU 101 executes step S607. In a case where no notification is received, the CPU 101 executes step S620.

From step S607 onward, the operations are as described above. However, in the operations of step S610, step S611, and step S612, the face detection result and the determination result relating to reflections received from the image processing circuit 104 in step S605 are used.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-017739, filed on Feb. 5, 2021, which is hereby incorporated by reference herein in its entirety.

What is claimed is:

1. An image processing apparatus comprising:
   one or more processors that execute a program stored in a memory and thereby function as an acquisition unit that acquires first image data obtained by capturing an image of a subject, second image data obtained by capturing an image of a person capturing the subject and surroundings thereof, and third image data indicating an appearance of an image capture apparatus that captures the image of the subject; and
   an image processing circuit that acquires image data in which a reflection in the first image data is reduced using a learned machine learning model that uses the first image data, the second image data, and the third image data as input data.

2. The image processing apparatus according to claim 1, further comprising:
   a storage apparatus storing the learned machine learning model.

3. The image processing apparatus according to claim 1, wherein
   the image processing circuit uses the learned machine learning model downloaded from an external apparatus.

4. The image processing apparatus according to claim 1, wherein
the image processing circuit transmits the first image data, the second image data, and the third image data to an external apparatus including the learned machine learning model and acquires image data in which the reflection is reduced from the external apparatus.

5. The image processing apparatus according to claim 1, wherein
the learned machine learning model is a machine learning model trained using the first image data, the second image data, and the third image data as input data and image data corresponding to the first image data with no reflection as target data.

6. The image processing apparatus according to claim 1, wherein
the first image data and the second image data are image data captured at a corresponding timing by different image capture apparatuses.

7. The image processing apparatus according to claim 1, further comprising:
a first image capture apparatus;
a second image capture apparatus with a different image capture direction to the first image capture apparatus; and
a storage apparatus that stores the third image data, wherein
image data obtained by the first image capture apparatus is used as the first image data and image data obtained by the second image capture apparatus is used as the second image data.

8. The image processing apparatus according to claim 1, wherein
the image processing circuit displays a video based on the first image data and a video based on the second image data on a display apparatus.

9. The image processing apparatus according to claim 1, wherein
in a case where the image processing circuit determines that an area similar to a second image represented by the second image data is included in a first image represented by the first image data, the image processing circuit determines that a reflection is in the first image data.

10. The image processing apparatus according to claim 7, wherein
in a case where an area similar to the second image represented by the second image data is included in the first image represented by the first image data, a face area is detected in the area similar to the second image, and a face area is not detected in the second image, the image processing circuit displays, on a display apparatus, an indicator prompting a user of the image processing apparatus to change position of the image processing apparatus so that a face is captured by the second image capture apparatus.

11. The image processing apparatus according to claim 10, wherein
the indicator is displayed, on the display apparatus, superimposed on a video based on the second image data.

12. An image processing method executed by an image processing apparatus, comprising:
acquiring first image data obtained by capturing an image of a subject, second image data obtained by capturing an image of a person capturing the subject and surroundings thereof, and third image data indicating an appearance of an image capture apparatus that captures the image of the subject; and
acquiring image data in which a reflection in the first image data is reduced using a learned machine learning model that uses the first image data, the second image data, and the third image data as input data.

13. A non-transitory computer-readable storage medium storing a program for causing a computer to execute an image processing method comprising:
acquiring first image data obtained by capturing an image of a subject, second image data obtained by capturing an image of a person capturing the subject and surroundings thereof, and third image data indicating an appearance of an image capture apparatus that captures the image of the subject; and
acquiring image data in which a reflection in the first image data is reduced using a learned machine learning model that uses the first image data, the second image data, and the third image data as input data.

* * * * *